United States Patent
Choi et al.

(10) Patent No.: US 11,495,165 B2
(45) Date of Patent: Nov. 8, 2022

(54) DISPLAY DEVICE AND DRIVING METHOD THEREOF

(71) Applicant: SAMSUNG DISPLAY CO., LTD., Yongin-si (KR)

(72) Inventors: Jae Woo Choi, Yongin-si (KR); Tae Joon Kim, Yongin-si (KR); Eun Sol Seo, Yongin-si (KR); Hyun Wook Cho, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 17/457,818

(22) Filed: Dec. 6, 2021

(65) Prior Publication Data

US 2022/0100320 A1 Mar. 31, 2022

Related U.S. Application Data

(63) Continuation of application No. 16/449,049, filed on Jun. 21, 2019, now Pat. No. 11,195,447.

(30) Foreign Application Priority Data

Sep. 3, 2018 (KR) ........................ 10-2018-0104791

(51) Int. Cl.
*G09G 3/20* (2006.01)
*G06F 3/044* (2006.01)
(Continued)

(52) U.S. Cl.
CPC ......... *G09G 3/2092* (2013.01); *G06F 3/0412* (2013.01); *G06F 3/0443* (2019.05);
(Continued)

(58) Field of Classification Search
None
See application file for complete search history.

(56) References Cited

U.S. PATENT DOCUMENTS 9,357,045 B2  5/2016 Oishi et al.
9,442,143 B2  9/2016 Erkens
(Continued)

FOREIGN PATENT DOCUMENTS

JP  5995473  9/2016
JP  6177627  8/2017
(Continued)

*Primary Examiner* — Stephen T. Reed
(74) *Attorney, Agent, or Firm* — F. Chau & Associates, LLC

(57) ABSTRACT

A display device is described including a display panel for displaying an image and an input sensing unit disposed on the display panel for sensing a user input. The input sensing unit includes: an electrode unit including first electrodes and second electrodes which intersect each other and a control unit for determining the proximity of an object or the shape of the object, based on capacitance change values of the first electrodes and the second electrodes. In a first mode the input sensing unit is driven using a self-capacitance method. The control unit may merge the capacitance change values, and determine the proximity of the object based on the merged value. In a second mode based on mutual capacitance, the control unit may determine the shape of the object.

16 Claims, 7 Drawing Sheets

(51) Int. Cl.
    *G06F 3/041*           (2006.01)
    *H04W 52/02*         (2009.01)
    *H04M 1/02*          (2006.01)
    *H04M 1/72454*     (2021.01)

(52) U.S. Cl.
    CPC ........ *G06F 3/0446* (2019.05); *G06F 3/04164* (2019.05); *G06F 3/041662* (2019.05); *H04M 1/0266* (2013.01); *H04M 1/72454* (2021.01); *H04W 52/027* (2013.01); *G06F 2203/04101* (2013.01); *G06F 2203/04108* (2013.01); *G06F 2203/04112* (2013.01); *G09G 2330/027* (2013.01); *G09G 2354/00* (2013.01); *H04M 2250/22* (2013.01)

(56) References Cited

U.S. PATENT DOCUMENTS

| | | | |
|---|---|---|---|
| 2014/0253488 A1* | 9/2014 | Vukovic | G06F 3/04164 345/174 |
| 2015/0049043 A1* | 2/2015 | Yousefpor | G06F 3/04186 345/174 |
| 2015/0062093 A1 | 3/2015 | Ksondzyk et al. | |
| 2018/0157371 A1 | 6/2018 | Harrison et al. | |
| 2018/0373381 A1* | 12/2018 | Kang | G06F 3/047 |
| 2020/0074913 A1 | 3/2020 | Choi et al. | |

FOREIGN PATENT DOCUMENTS

| | | |
|---|---|---|
| KR | 10-2010-0109996 | 10/2010 |
| KR | 10-2013-0078937 | 7/2013 |
| KR | 10-1830796 | 2/2018 |

\* cited by examiner

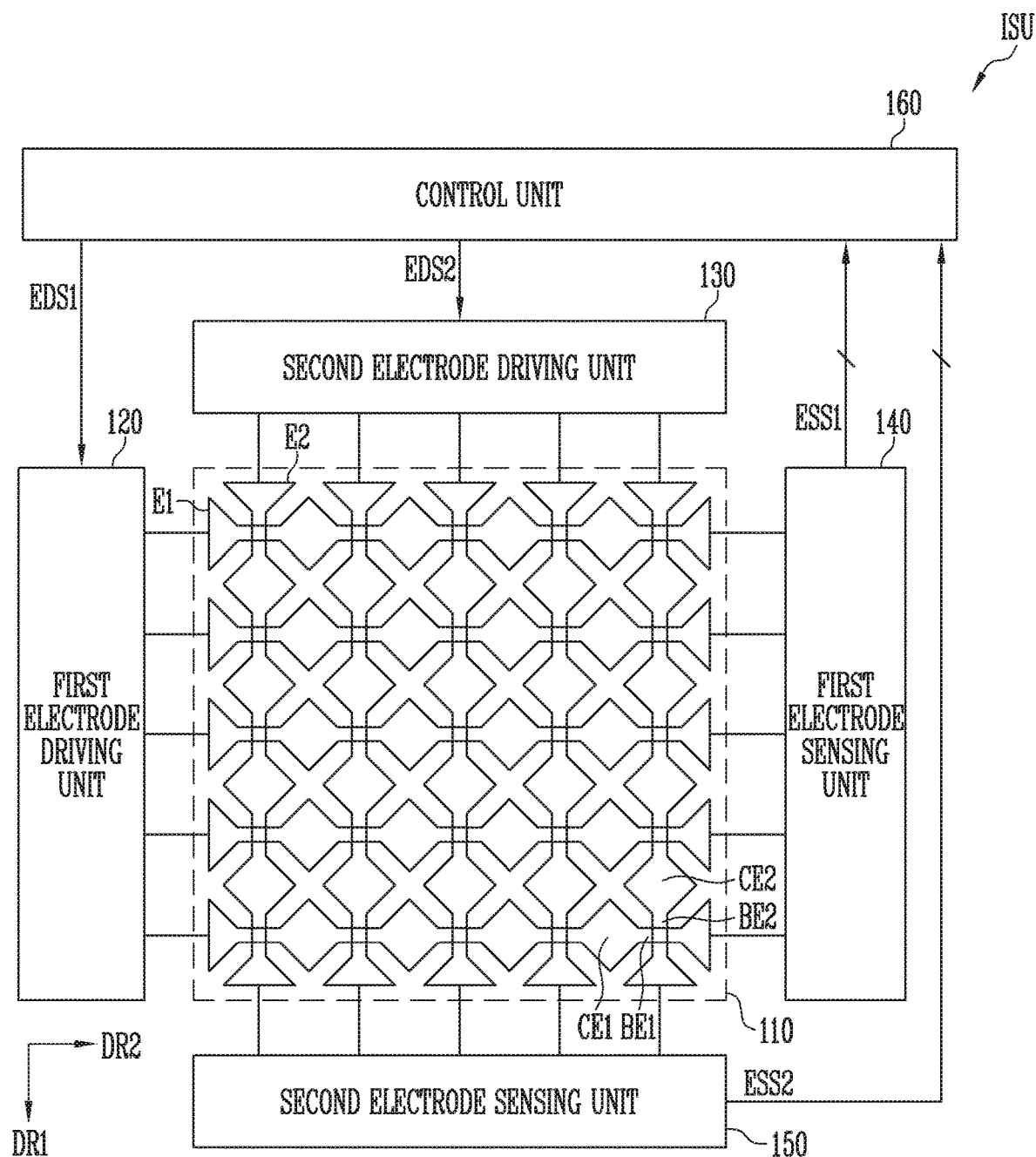

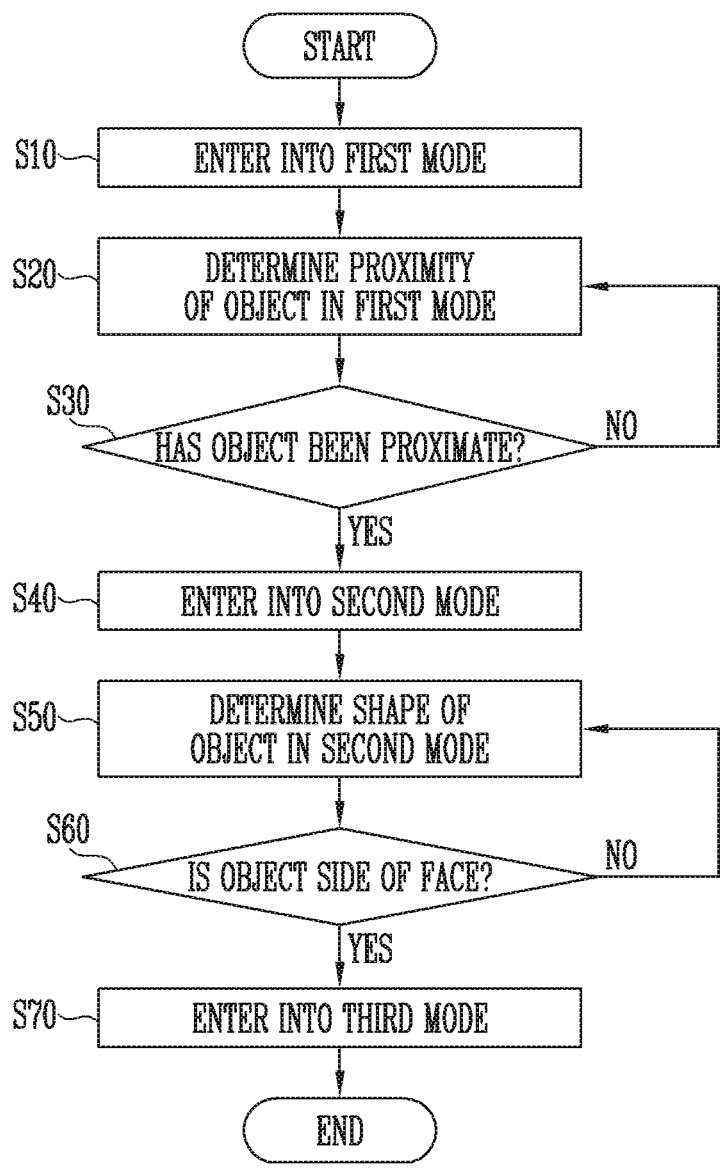

DISPLAY DEVICE AND DRIVING METHOD THEREOF

CROSS-REFERENCE TO RELATED APPLICATION

The present application claims priority under 35 U.S.C. § 119(a) to Korean patent application 10-2018-0104791 filed on Sep. 3, 2018 in the Korean Intellectual Property Office and U.S. patent application Ser. No. 16/449,049 filed on Jun. 21, 2019, the entire contents of which are incorporated by reference herein.

BACKGROUND

1. Technical Field

The present disclosure generally relates to a display device and a driving method thereof.

2. Related Art

With the development of information technologies, the importance of a display device, which is a connection medium between a user and information, increases. Accordingly, display devices such as a liquid crystal display device and an organic light emitting display device are increasingly used.

A display device displays a target image to a user by writing a data voltage for expressing a target gray scale in each pixel, and allowing an organic light emitting diode to emit light or allowing light of a backlight unit to be polarized by controlling the orientation of liquid crystals corresponding to the data voltage.

In many cases, a display device may continue to display an image even if the image is not viewable by a user. This may result in additional power consumption, which may limit the usefulness of the device.

SUMMARY

Embodiments provide for a display device capable of reducing power consumption and a driving method thereof.

According to an aspect of the present disclosure, there is provided a display device including: a display panel configured to display an image; and an input sensing unit disposed on the display panel, the input sensing unit sensing a user input, wherein the input sensing unit includes: an electrode unit including first electrodes and the second electrodes, which intersect each other; and a control unit configured to determine a proximity of an object or a shape of the object, based on capacitance change values of the first electrodes and the second electrodes, wherein, the control unit is configured to merge the capacitance change values, and determine the proximity of the object based on the merged value, in a first mode driven using a self-capacitance method.

When it is determined that the object has been proximate, the control unit may determine the shape of the object based on the capacitance change values in a second mode, driven using a mutual-capacitance method.

In the first mode, the first electrodes and the second electrodes may be integrated and driven as one electrode.

When it is determined that the object is a side of a face, the display panel may stop displaying the image in a third mode.

The input sensing unit may be directly disposed on the display panel.

The input sensing unit may be coupled to the display panel through an adhesive member.

The input sensing unit may further include: a first electrode driving unit configured to provide a first driving voltage to the first electrodes; and a second electrode driving unit configured to provide a second driving voltage to the second electrodes. In the first mode, the first electrode driving unit and the second electrode driving unit may simultaneously supply the first driving voltage and the second driving voltage to the first electrodes and the second electrodes.

The first driving voltage and the second driving voltage may be equal to each other.

The input sensing unit may further include: a first electrode sensing unit configured to generate a first sensing signal representing the capacitance change values of the first electrodes; and a second electrode sensing unit configured to generate a second sensing signal representing the capacitance change values of the second electrodes.

Each of the first electrodes may include first sensor parts and first connecting parts for connecting the first sensor parts to each other, and each of the second electrodes may include second sensor parts and second connecting parts for connecting the second sensor parts to each other. The first sensor parts and the second sensor parts may be disposed in same layer.

The first connecting part and the second connecting part may be disposed in different layers.

When it is determined that the object has been proximate, the display panel may stop the display of the image in a third mode.

According to another aspect of the present disclosure, there is provided a method for driving a display device including a display panel for displaying an image; and an input sensing unit disposed on the display panel, the input sensing unit including first electrodes and second electrodes, which intersect each other, the method including: entering into a first mode (e.g., during a call) in which the input sensing unit is driven using a self-capacitance method; in the first mode, merging capacitance change values of the first electrodes and the second electrodes, and determining proximity of an object, based on the merged value; when it is determined that the object has been proximate, entering into a second mode in which the input sensing unit is driven using a mutual-capacitance method; in the second mode, determining a shape of the object; and when it is determined that the object is a side of a face, entering into a third mode in which the display panel stops displaying the image.

In the determining of the shape of the object, the shape of the object may be determined based on the capacitance change values in the second mode.

The input sensing unit may further include: a first electrode driving unit configured to provide a first driving voltage to the first electrodes; and a second electrode driving unit configured to provide a second driving voltage to the second electrodes. In the first mode, the first electrode driving unit and the second electrode driving unit may simultaneously supply the first driving voltage and the second driving voltage to the first electrodes and the second electrodes.

The input sensing unit may further include: a first electrode sensing unit configured to generate a first sensing signal representing the capacitance change values of the first electrodes; and a second electrode sensing unit configured to generate a second sensing signal representing the capacitance change values of the second electrodes.

In the first mode, the first electrodes and the second electrodes may be integrated and driven as one electrode.

According to still another aspect of the present disclosure, there is provided a method for driving a display device including a display panel for displaying an image; and an input sensing unit disposed on the display panel, the input sensing unit including first electrodes and second electrodes, which intersect each other, the method including: entering into a first mode in which the input sensing unit is driven using a self-capacitance method; in the first mode, merging capacitance change values of the first electrodes and the second electrodes, and determining proximity of an object, based on the merged value; and when it is determined that the object has been proximate, entering into a third mode in which the display panel stops displaying the image.

In the display device and the driving method thereof according to the present disclosure, power consumption can be reduced and call quality can be improved.

BRIEF DESCRIPTION OF THE DRAWINGS

Example embodiments will now be described more fully herein with reference to the accompanying drawings; however, the inventive concepts of the present disclosure may be embodied in different forms and should not be construed as limited to the embodiments set forth herein. Rather, these embodiments are provided so that this disclosure will be thorough and complete, and will fully convey the scope of the example embodiments to those skilled in the art.

In the drawing figures, dimensions may be exaggerated for clarity of illustration. It will also be understood that when an element is referred to as being "between" two elements, it can be the only element between the two elements, or one or more intervening elements may also be present. Like reference numerals refer to like elements throughout.

FIG. 5 is a view illustrating an input sensing unit according to an embodiment of the present disclosure.

FIGS. 6A and 6B are flowcharts illustrating driving methods of the display device according to embodiments of the present disclosure.

DETAILED DESCRIPTION

Figure 1:
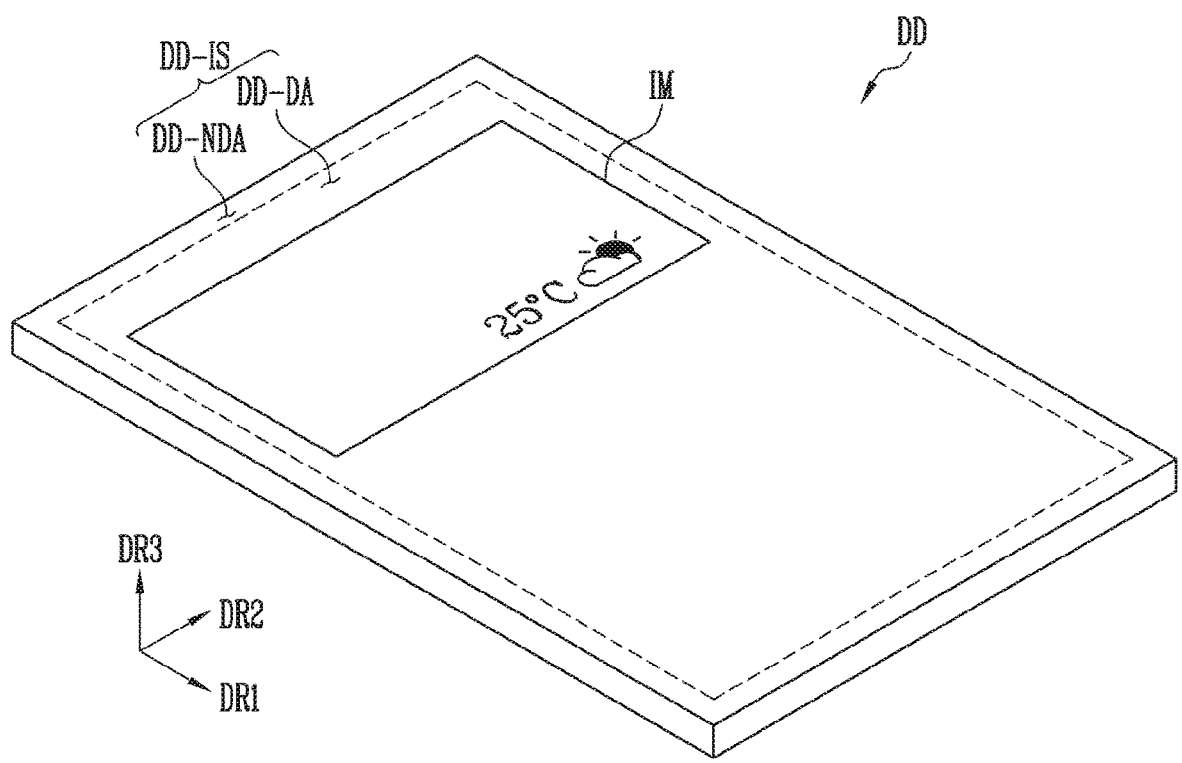
FIG. 1 is a view illustrating a display device according to an embodiment of the present disclosure.

The present disclosure describes systems and methods for utilizing a display device with an input sensing unit capable of determining the proximity and/or shape of external objects. The display device may operate by switching between multiple modes of operation such as a proximity sensing mode, a shape sensing mode, and a power saving mode.

For example, in a first mode, an input sensing unit may determine the proximity of an external object (e.g., based on self-capacitance). If it is determined that the object is proximate, the device may enter into a second mod. In the second mode, the input sensing unit may determine a shape of the object (e.g., based on mutual-capacitance). Based on the shape, the device may enter a power saving mode. For example, the device may enter a power saving mode if it is determined that the object is the side of a face.

In the following detailed description, certain exemplary embodiments of the present disclosure have been shown and described by way of illustration. As those skilled in the art would realize, the described embodiments may be modified in various different ways, without departing from the spirit or scope of the present disclosure. Accordingly, the drawings and description are to be regarded as illustrative in nature and not restrictive.

Like numbers refer to like elements throughout, and duplicative descriptions thereof may not be provided. The thicknesses, ratios, and dimensions of elements may be exaggerated in the drawings for clarity. As used herein, the term "and/or" includes any and all combinations of one or more of the associated listed items.

It will be understood that, although the terms "first," "second," etc. may be used herein to describe one or more elements, these terms should not be construed as limiting such elements. These terms are only used to distinguish one element from another element. Thus, a first element could be alternately termed a second element without departing from the spirit and scope of the present disclosure. Similarly, a second element could be alternately termed a first element. Singular forms of terms are intended to include the plural forms as well, unless the context clearly indicates otherwise.

Moreover, spatially relative terms, such as "beneath," "below," "lower," "above," "upper," and the like may be used herein for ease of description to describe one element's spatial relationship to another element(s) as illustrated in the drawings. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

It will be further understood that the terms "includes" and "including," when used in this disclosure, specify the presence of stated features, integers, acts, operations, elements, and/or components, but do not preclude the presence or addition of one or more other features, integers, steps, operations, elements, components, and/or groups thereof.

In the entire specification, when an element is referred to as being "connected" or "coupled" to another element, it can be directly connected or coupled to the other element or be indirectly connected or coupled to the another element with one or more intervening elements interposed therebetween. Further, some of the elements that are not essential to the complete understanding of the disclosure are omitted for clarity. Also, like reference numerals refer to like elements throughout.

FIG. 1 is a view illustrating a display device DD according to an embodiment of the present disclosure.

As shown in FIG. 1, the display device DD may include a display surface DD-IS.

The display surface DD-IS may be located at a front surface of the display device DD. The display device DD may display an image IM through the display surface DD-IS. The display surface DD-IS is parallel to a surface defined by a first direction DR1 and a second direction DR2. A normal direction of the display surface DD-IS, i.e., a thickness direction of the display device DD with respect to the display surface DD-IS indicates a third direction DR3.

A front surface (or top surface) and a back surface (or bottom surface) of each member or unit described herein is distinguished by the third direction DR3. However, the first to third directions DR1, DR2, and DR3 illustrated in this embodiment are merely illustrative, and the directions indicated by the first to third directions DR1, DR2, and DR3 are relative concepts, and may be changed into other directions. Hereinafter, first to third directions are directions respectively indicated by the first to third directions DR1, DR2, and DR3, and are designated by like reference numerals.

In an embodiment of the present disclosure, the display device DD including a planar display surface DD-IS is illustrated, but the present disclosure is not limited thereto. The display device DD may include a curved display surface DD-IS or a stereoscopic display surface DD-IS.

The display device DD may be a rigid display device according to some embodiments of the present disclosure. However, the present disclosure is not limited thereto, and the display device DD may be also flexible display device, according to other embodiments of the present disclosure.

According to one embodiment, the display device DD may comprise or may be a component of a mobile phone terminal. Although not shown in the drawing, electronic modules, a camera module, a power module, and the like, which are mounted on a main board, are disposed together with the display device DD in a bracket or case, etc., thereby constituting a mobile phone terminal.

The display device DD according to the present disclosure may be applied to not only large-sized electronic devices such as televisions and monitors but also to medium and small-sized electronic devices such as tablet PCs, vehicle navigation systems, game consoles, smart watches, and head mounted displays.

Referring to FIG. 1, the display surface DD-IS includes a display region DD-DA in which the image IM is displayed and a non-display region DD-NDA adjacent to the display region DD-DA.

The non-display region DD-NDA may be a region in which the image IM is not displayed. In FIG. 1, temperature and weather images are illustrated as an example of the image IM.

As shown in FIG. 1, the display region DD-DA may have a quadrangular shape. However, the present disclosure is not limited thereto, and the display region DD-DA and the non-display region DD-NDA may be designed in various shapes (e.g., a rhombus shape, a circular shape, an elliptical shape, and the like). The non-display region DD-NDA may surround the display region DD-DA.

According to various examples of the present disclosure, components of the display device DD may be operated in one of several modes that may be characterized by different operational functions as well as different power consumption characteristics. For example, components of the display device may be operated in a proximity sensing mode and a shape sensing mode.

For example, as discussed above, the display device DD may be implemented with a mobile phone. When a user makes a call, using the display device DD or a mobile phone comprising the display device, the display device DD may be driven in any one of a first mode, a second mode, and a third mode.

The first mode may be a proximity sensing mode. The second mode may be a shape sensing mode. Detailed contents related to the second mode will be described with reference to FIG. 5.

The third mode may be a call activation mode. In the third mode, the display device DD stops the display of the image in the display region DD-DA, so that power consumption can be reduced. In some embodiments, the display device DD further allocates a system resource to a call function in the third mode, so that call quality can be improved. Detailed contents of a driving method of the display device DD in the third mode will be described in detail with reference to FIGS. 6A and 6B.

Figure 2A:
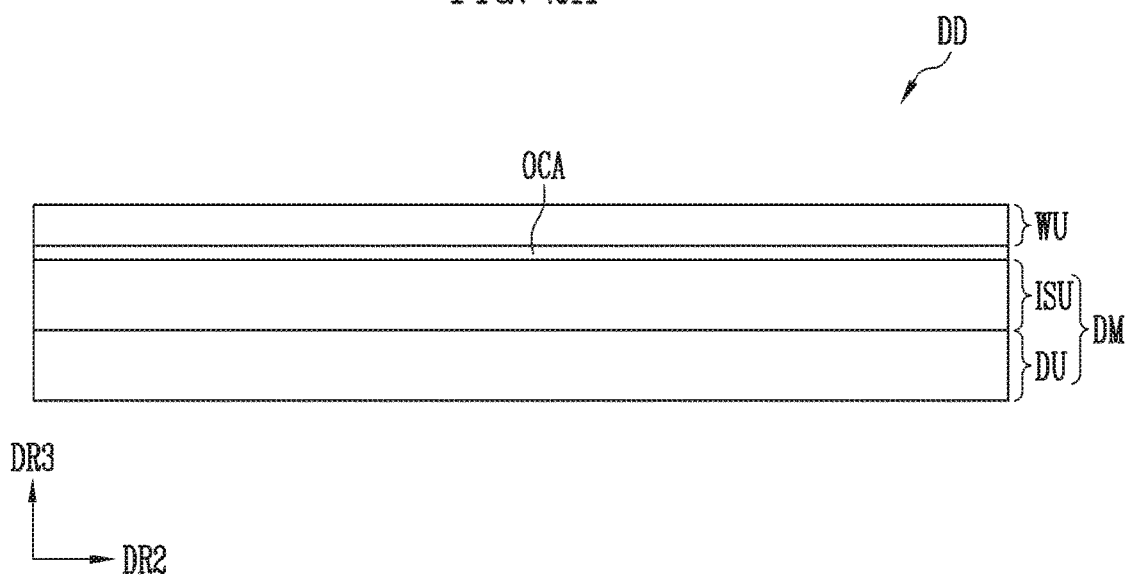
FIGS. 2A and 2B are views illustrating sections of the display device according to embodiments of the present disclosure.
Figure 2B:
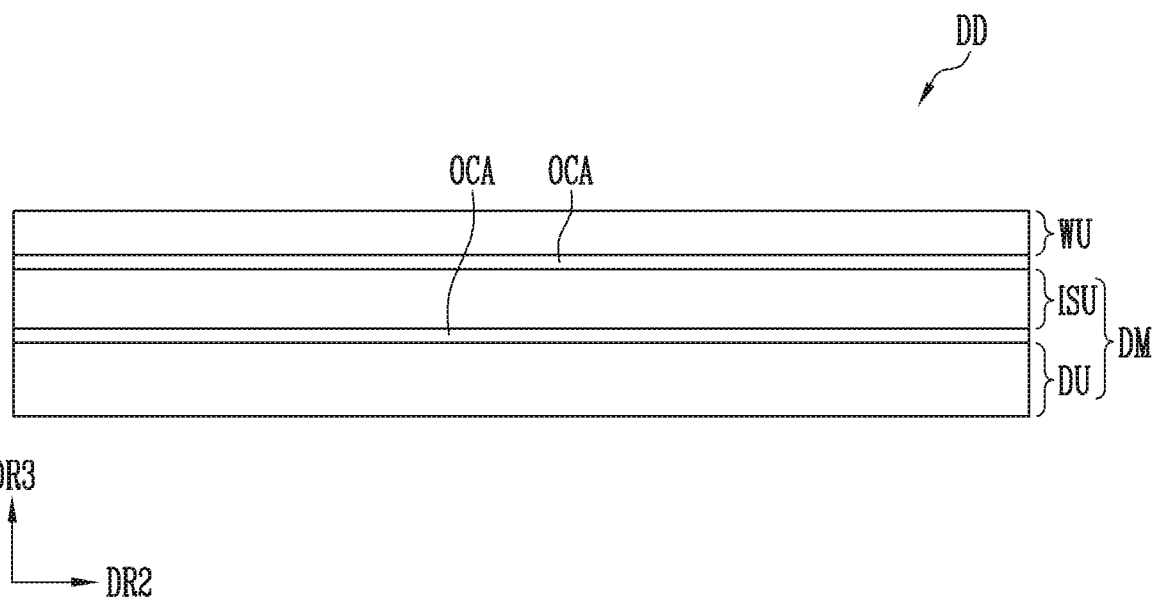

FIGS. 2A and 2B are views illustrating sections of the display device according to embodiments of the present disclosure.

FIGS. 2A and 2B illustrate sections defined by a second direction DR2 and a third direction DR3. FIGS. 2A and 2B are simply illustrated to describe stacking relationships between a functional panel and/or functional units which constitute the display device DD.

The display device DD, according to an embodiment of the present disclosure, may include a display panel DU, an input sensing unit ISU, and a window unit WU. At least some components among the display panel DU, the input sensing unit ISU, and the window unit WU may be integrally formed by a continuous process (and may thus be connected without an adhesive). Alternatively, at least some components among the display panel DU, the input sensing unit ISU, and the window unit WU may be coupled to each other through an adhesive member. In FIGS. 2A and 2B, an optically transparent adhesive member OCA is illustrated as a representative example of the adhesive member. The adhesive member described herein may include a general adhesive or gluing agent.

A corresponding component coupled to another component through a continuous process (e.g., the input sensing unit ISU and the window unit WU) may be referred to as a "layer."

A corresponding component coupled to another component using an adhesive (e.g. the adhesive member OCA between the input sensing unit ISU and the window unit WU) may be referred to as a "panel."

A "panel" may include a base layer that provides a base surface, e.g., a synthetic resin film, a composite material film, a glass substrate, and the like, but the base layer may be omitted in a "layer." In some cases, the units referred to as a "layer" may be disposed on a base surface provided by another unit.

Thus, the input sensing unit ISU and the window unit WU may be designated as an input sensing panel and a window panel, respectively, or an input sensing layer and a window layer, respectively, according to whether a base layer exists.

In present disclosure, that component A is "directly disposed" on component B means that a separate adhesive layer or adhesive member is not disposed between component A and component B. Thus, if component A is "directly disposed" on component B, then component B may be formed on a base surface provided by component A through a continuous process (e.g., after component A is formed).

Referring to FIGS. 2A and 2B, the display device DD may include the display panel DU, the input sensing unit ISU, and the window unit WU.

The input sensing unit ISU, according to an embodiment shown in FIG. 2A, may be directly disposed on the display panel DU. That is, the input sensing unit ISU shown in FIG. 2A may be an input sensing layer.

Alternatively, the input sensing unit ISU, according to another embodiment shown in FIG. 2B, may be disposed on the display panel DU, and may be coupled to the display panel DU through an optically transparent adhesive member OCA. That is, the input sensing unit ISU shown in FIG. 2B may be an input sensing panel.

Hereinafter, common features of the display device DD are described, according to the embodiments shown in FIGS. 2A and 2B.

The display panel DU may generate an image. The display panel DU and the input sensing unit ISU together may be referred to as a display module DM.

The display module DM may be coupled to the window unit WU through the optically transparent adhesive member OCA. That is, the window unit WU shown in FIGS. 2A and 2B may be a window panel. However, the present disclosure is not limited thereto. In some embodiments, the window unit WU may be directly disposed on the display module DM. Therefore, the window unit WU may be a window layer. The window unit WU may protect the display panel DU and the input sensing unit ISU from external forces and conditions.

In an embodiment of the present disclosure, the display panel DU may be a light emitting display panel. However, the present disclosure is not limited thereto. In some embodiments, the display panel DU may be an organic light emitting display panel or a quantum dot light emitting display panel. An emitting layer of an organic light emitting display panel may include an organic light emitting material. An emitting layer of a quantum dot light emitting display panel may include a quantum dot, a quantum rod, and the like. Hereinafter, the display panel DU is described as an organic light emitting display panel.

The input sensing unit ISU may sense a user input (e.g., a touch, a pressure, a fingerprint, etc.). That is, the input sensing unit ISU may acquire coordinate information or pressure information of the user input.

FIGS. 2A and 2B illustrate a case where input sensing unit ISU entirely overlaps with the display panel DU. Referring to FIGS. 1, 2A, and 2B, the input sensing unit ISU may entirely overlap with the display region DD-DA. However, the present disclosure is not limited thereto, and the input sensing unit ISU may partially overlap with the display region DD-DA or overlap with only the non-display region DD-NDA.

The input sensing unit ISU may be a touch sensing panel for sensing a touch of a user, or it may be a fingerprint sensing panel for sensing fingerprint information of a finger of the user.

Figure 3:
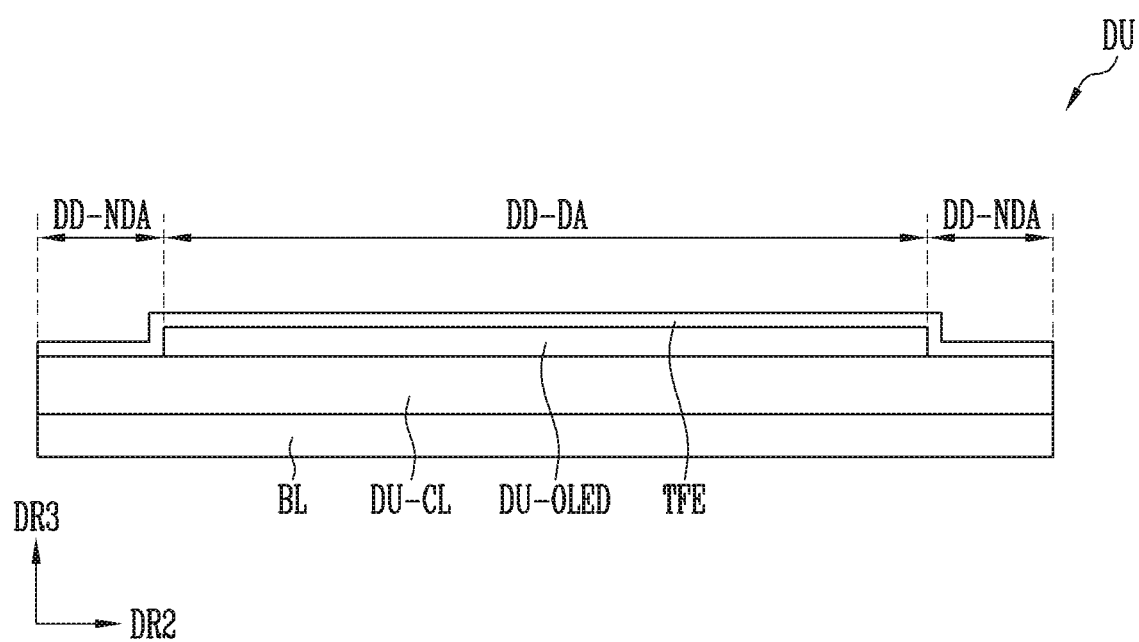
FIG. 3 is a view illustrating a section of a display panel according to an embodiment of the present disclosure.

FIG. 3 is a view illustrating a section of a display panel DU according to an embodiment of the present disclosure.

Referring to FIG. 3, the display panel DU may include a base layer BL, and a circuit element layer DU-CL, a display element layer DU-OLED, and a thin film encapsulation layer TFE, which are disposed on the base layer BL. Although not separately shown in the drawing, the display panel DU may further include functional layers such as an anti-reflection layer, and a refractive adjustment layer.

The base layer BL may include a synthetic resin layer. The synthetic resin layer may be formed on a working substrate used when the display panel DU is fabricated. Subsequently, a conductive layer, an insulating layer, and the like are formed on the synthetic resin layer. When the working substrate is removed, the synthetic resin layer may correspond to the base layer BL. The synthetic resin layer may be a polyimide-based resin layer, and may be comprised of any suitable material. In addition, the base layer BL may include a glass substrate, a metal substrate, an organic or inorganic complex material substrate, etc.

The circuit element layer DP-CL may include at least one insulating layer and at least one circuit element. The insulating layer included in the circuit element layer DP-CL may be referred to as an interlayer insulating layer. The interlayer insulating layer may include at least one interlayer inorganic layer and at least one interlayer organic layer.

The circuit element may include, for example, a signal line, or a driving circuit of a pixel. The circuit element layer DU-CL may be formed by forming an insulating layer, a semiconductor layer, and a conductive layer. These layers may be formed by coating, deposition, etc. using a patterning process. The insulating layer, the semiconductor layer, and the conductive layer, may also be formed using a photolithography process.

The display element layer DU-OLED may include a light emitting element. For example, the display element layer DU-OLED may include organic light emitting diodes. The display element layer DU-OLED may further include an organic layer such as a pixel defining layer.

The thin film encapsulation layer TFE encapsulates the display element layer DU-OLED. The thin film encapsulation layer TFE may include at least one insulating layer. In an embodiment of the present disclosure, the thin film encapsulation layer TFE may include at least one inorganic layer (which may also be referred to as an encapsulation inorganic layer). In an embodiment of the present disclosure, the thin film encapsulation layer TFE may include at least one organic layer (which may also be referred to as an encapsulation organic layer) in addition to the at least one encapsulation inorganic layer.

The encapsulation inorganic layer may protect the display element layer DU-OLED from moisture and oxygen, and the encapsulation organic layer may protect the display element layer DU-OLED from foreign substances such as dust particles. The encapsulation inorganic layer may include a silicon nitride layer, a silicon oxynitride layer, a silicon oxide layer, a titanium oxide layer, an aluminum oxide layer, etc., but is not particularly limited thereto. The encapsulation organic layer may include an acryl-based organic layer, but is not particularly limited thereto.

As shown in FIG. 3, the display region DD-DA may be defined by the display element layer DU-OLED.

Figure 4:
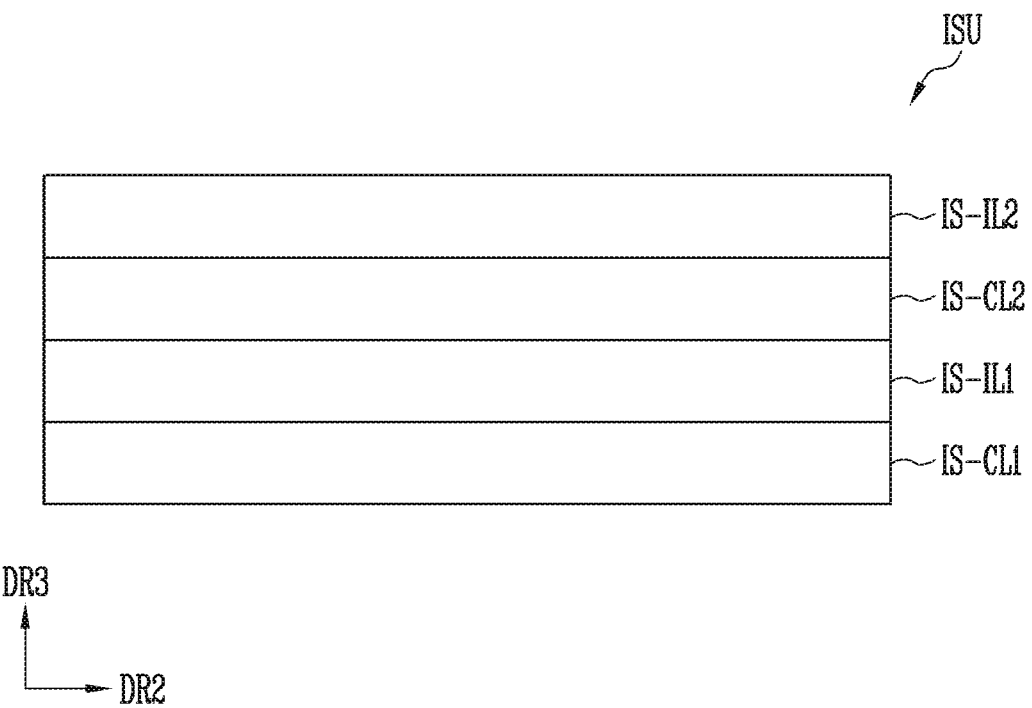
FIG. 4 is a view illustrating a section of an input sensing unit according to an embodiment of the present disclosure.

FIG. 4 is a view illustrating a section of an input sensing unit ISU according to an embodiment of the present disclosure.

The input sensing unit ISU in the "layer" form, which is described in FIG. 2A, is directly disposed on the base surface provided by the display panel DU. Therefore, unlike an input sensing unit ISU in the "panel" form, the input sensing unit ISU in the "layer" form may not include the base layer, and hence the thickness of the display module DM may be decreased. The base surface of the input sensing unit ISU shown in FIG. 4 may correspond to a top surface of the thin film encapsulation layer TFE of the display panel DU shown in FIG. 3.

An input sensing unit ISU in the "panel" form, which is described in FIG. 2B, may be disposed on a separate base layer (not shown). The separate base layer (not shown) may be disposed on the display panel DU.

The input sensing unit ISU in either of the "layer" form or the "panel" form may have a multi-layered structure.

The input sensing unit ISU may include first electrodes (e.g., driving electrodes), second electrodes (e.g., sensing electrodes), and at least one insulating layer. The input sensing unit ISU may sense an external input (e.g., using a capacitance method).

Referring to FIG. 4, the input sensing unit ISU may include a first conductive layer IS-CL1, a first insulating layer IS-IL1, a second conductive layer IS-CL2, and a second insulating layer IS-IL2. In some embodiments, the first conductive layer IS-CL1, the first insulating layer IS-IL1, the second conductive layer IS-CL2, and the second insulating layer IS-IL2 may be sequentially stacked.

Each of the first conductive layer IS-CL1 and the second conductive layer IS-CL2 may have a single-layered structure, or they may have a multi-layered structure in which layers are stacked along a third direction DR3. Each of the first conductive layer IS-CL1 and the second conductive layer IS-CL2 may include at least one of a metal layer and a transparent conductive layer.

In some embodiments, each of the first conductive layer IS-CL1 and the second conductive layer IS-CL2 may include first electrodes or second electrodes. However, the present disclosure is not limited thereto, and any one of the first conductive layer IS-CL1 and the second conductive layer IS-CL2 may include first electrodes and second electrodes.

The stacking structure and material of the sensing electrodes may be determined based at least in part on sensing sensitivity. An RC delay may have influence on the sensing sensitivity. Since sensing electrodes including a metal layer may have a resistance lower than that of the transparent conductive layer, the RC value of the sensing electrodes is decreased. Therefore, the charging time of a capacitor defined by the sensing electrodes is decreased accordingly.

Sensing electrodes including a transparent conductive layer may not be viewable by a user, in contrast with those including a metal layer. Therefore, the input area of sensing electrodes including a transparent conductive layer may be increased, thereby increasing capacitance. In some cases, sensing electrodes including a metal layer may have a mesh shape to prevent them from being viewable by a user.

Each of the first insulating layer IS-IL1 and the second insulating layer IS-IL2 may have a single- or multi-layered structure. Each of the first insulating layer IS-IL1 and the second insulating layer IS-IL2 may include an inorganic material, an organic material, or a composite material.

FIG. 5 is a view illustrating an input sensing unit ISU according to an embodiment of the present disclosure.

The input sensing unit ISU according to an embodiment of the present disclosure may be driven using a self-capacitance method in a first mode (e.g., a proximity sensing mode). The input sensing unit ISU may be driven using a mutual-capacitance method in a second mode (e.g., a shape sensing mode). Detailed contents related to this will be described below.

Referring to FIG. 5, the input sensing unit ISU may include an electrode unit 110, a first electrode driving unit 120, a second electrode driving unit 130, a first electrode sensing unit 140, a second electrode sensing unit 150, and a control unit 160.

The electrode unit 110 may correspond to the display region DD-DA shown in FIG. 1. However, the present disclosure is not limited thereto. In some embodiments, the electrode unit 110 may correspond to the display region DD-DA and the non-display region DD-NDA, or correspond to at least one of a front portion, a side portion, and a rear portion of the display device DD.

The electrode unit 110 may include first electrodes E1 and second electrodes E2. For convenience of description, FIG. 5 illustrates an embodiment in which the number of each of the first electrodes E1 and the second electrodes E2 is five, but the present disclosure is not limited thereto. In some embodiments, the first electrodes E1 and the second electrodes E2 may be designed such that the number of each of the first electrodes E1 and the second electrodes E2 is variously modified.

The first electrodes E1 may be arranged along a first direction DR1, and may extend along a second direction DR2. The second electrodes E2 may be arranged along the second direction DR2, and may extend along the first direction DR1. The first direction DR1 and the second direction DR2 may be different from (e.g., orthogonal to) each other. The first electrodes E1 and the second electrodes E2 may intersect each other.

The first electrodes E1 may include first sensor parts CE1 and first connecting parts BE1.

The first sensor parts CE1 may be arranged along the second direction DR2 in which the first electrodes E1 extend. Although first sensor parts CE1 having a diamond shape are illustrated in FIG. 5, the present disclosure is not limited thereto. In some embodiments, the first sensor parts CE1 may be implemented in various shapes. The first sensor parts CE1 may be spaced apart from the second electrodes E2.

The first connecting parts BE1 may connect the first sensor parts CE1 to each other.

The second electrodes E2 may include second sensor parts CE2 and second connecting parts BE2.

The second sensor parts CE2 may be arranged along the first direction DR1 in which the second electrodes E2 extend. Although second sensor parts CE2 having a diamond shape are illustrated in FIG. 5, the present disclosure is not limited thereto. In some embodiments, the second sensor parts CE2 may be implemented in various shapes. The second sensor parts CE2 may be spaced apart the first electrode E1.

The second connecting parts BE2 may connect the second sensor parts CE2 to each other.

The first sensor parts CE1 and the second sensor parts CE2 may be formed through the same process.

The first connecting parts BE1 and the second connecting parts BE2 may be formed through different processes. An insulating layer may be disposed between the first connecting parts BE1 and the second connecting parts BE2. Either of the first connecting parts BE1 and the second connecting parts BE2 may be formed through the same process as the first sensor parts CE1 and the second sensor parts CE2.

Referring to FIGS. 4 and 5, the first sensor parts CE1 and the second sensor parts CE2 may be included in any one of the first conductive layer IS-CL1 and the second conductive layer IS-CL2.

One of the first connecting parts BE1 and the second connecting parts BE2 may be included in the first conductive layer IS-CL1, and the other of the first connecting parts BE1 and the second connecting parts BE2 may be included in the second conductive layer IS-CL2.

Although not separately shown in the drawings, the connecting parts and the sensor parts, which are formed in different layers, may be electrically connected through a contact hole (not shown).

The first electrode driving unit 120 may receive a first driving control signal EDS1 from the control unit 160. The first electrode driving unit 120 may supply a first driving voltage to the first electrodes E1, based on the first driving control signal EDS1. For example, the first electrode driving unit 120 may sequentially or simultaneously supply the first driving voltage to the first electrodes E1.

The second electrode driving unit 130 may receive a second driving control signal EDS2 from the control unit 160. The second electrode driving unit 130 may supply a second driving voltage to the second electrodes E2, based on the second driving control signal EDS2. For example, the second electrode driving unit 130 may sequentially or simultaneously supply the second driving voltage to the second electrode E2.

In one example, the first driving voltage and the second driving voltage may be equal to each other. However, the present disclosure is not limited thereto. In some embodiments, the first driving voltage and the second driving voltage may be different from each other.

When an external object is located near, or is in contact with, the first electrodes E1 and the second electrodes E2, a capacitance of the first electrodes E1 and the second electrodes E2 may be changed.

The first electrode sensing unit 140 may generate a first sensing signal ESS1, based on the change in capacitance of the first electrodes E1, and transmit the first sensing signal ESS1 to the control unit 160. The first sensing signal ESS1 may include capacitance change values of the first electrodes E1.

The second electrode sensing unit 150 may generate a second sensing signal ESS2, based on the change in capacitance of the second electrodes E2, and transmit the second sensing signal ESS2 to the control unit 160. The second sensing signal ESS2 may include capacitance change values of the second electrodes E2.

The control unit 160 may control overall operations of the input sensing unit ISU.

The control unit 160 may determine the proximity or shape of an object based on the capacitance change values of the first electrode E1 and the second electrode E2.

For example, in a first mode, the control unit 160 may merge the capacitance change values of the first electrode E1 and the second electrode E2, and determine the proximity of the object based on the merged value. In a second mode, the control unit 160 may determine the shape of the object based on the capacitance change values of the first electrode E1 and the second electrode E2.

Specifically, the control unit 160 may transmit the first driving control signal EDS1 to the first electrode driving unit 120. The control unit 160 may transmit the second driving control signal EDS2 to the second electrode driving unit 130. Also, the control unit 160 may receive the first sensing signal ESS1 from the first electrode sensing unit 140. The control unit 160 may receive the second sensing signal ESS2 from the second electrode sensing unit 150. The control unit 160 may determine not only the input of a touch but also the proximity of the object and the shape of the object.

FIG. 5 illustrates a case where the first electrode driving unit 120, the second electrode driving unit 130, the first electrode sensing unit 140, the second electrode sensing unit 150, and the control unit 160 are different components. However, the present disclosure is not limited thereto.

In some embodiments, at least two components among the first electrode driving unit 120, the second electrode driving unit 130, the first electrode sensing unit 140, the second electrode sensing unit 150, and the control unit 160 may be integrally implemented.

In the first mode (e.g., driving using the self-capacitance method), the first electrode driving unit 120 may simultaneously supply a first driving voltage to the first electrodes E1. The second electrode driving unit 130 may also simultaneously supply a second driving voltage to the second electrodes E2. Thus, the first electrodes E1 and the second electrodes E2 may be driven as one electrode.

When an external object is located near, or in contact with, the electrode unit 110, the capacitance of each of the first electrodes E1 and the second electrodes E2 may be changed. The first electrode sensing unit 140 may generate a first sensing signal ESS1 and transmit the first sensing signal ESS1 to the control unit 160. The second electrode sensing unit 150 may generate a second sensing signal ESS2 and transmit the second sensing signal ESS2 to the control unit 160.

In the first mode, the control unit 160 may receive the first sensing signal ESS1 and the second sensing signal ESS2, and merge the capacitance change values of the first electrodes E1 with the capacitance change values of the second electrodes E2. The control unit 160 may then determine a proximity of the object based on the merged value.

In some cases, the proximity determination is a binary value. For example, when the merged value is larger than a predetermined value, the control unit 160 may determine that the object has been proximate, and when the merged value is less than the predetermined value, the control unit 160 may determine that the object has not been proximate. In other examples, the proximity determination may be a scalar value representing a distance from the display device DD.

Thus, the input sensing unit ISU (i.e., via the control unit 160) can determine the proximity of the object, and the sensing sensitivity of the input sensing unit ISU in the first mode can be enhanced.

In the second mode (e.g., driving using the mutual-capacitance method), the first electrode driving unit 120 may sequentially supply a first driving voltage to the first electrodes E1. In addition, the second electrode driving unit 130 may simultaneously supply a second driving voltage to the second electrodes E2.

When an external object is located near the electrode unit 110 or is in contact with the electrode unit 110, the capacitance of each of the first electrodes E1 and the second electrodes E2 may be changed. The first electrode sensing unit 140 may generate a first sensing signal ESS1 and transmit the first sensing signal ESS1 to the control unit 160. The second electrode sensing unit 150 may generate a second sensing signal ESS2 and transmit the second sensing signal ESS2 to the control unit 160.

In the second mode, the control unit 160 may receive the first sensing signal ESS1 and the second sensing signal ESS2. The control unit 160 may determine a shape of the object based on the first sensing signal ESS1 and the second sensing signal ESS2.

Through the above-described process, the input sensing unit ISU can determine the shape of the object and the resolution of the input sensing unit ISU in the second mode can be enhanced.

Figure 6B:
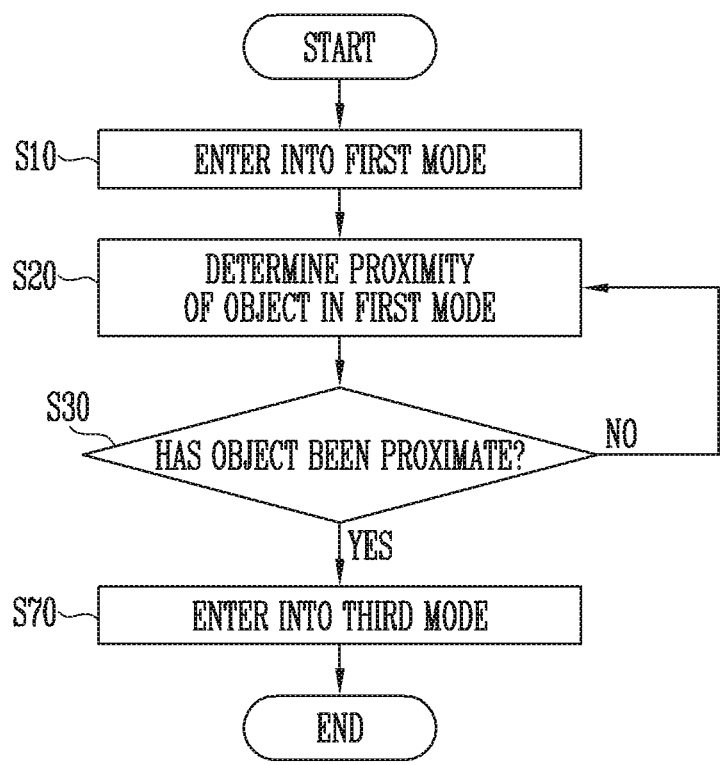

FIGS. 6A and 6B are flowcharts illustrating driving methods of the display device according to embodiments of the present disclosure.

Referring to FIGS. 1 to 6A, the driving method of the display device DD may include the following steps.

The display device DD according to an embodiment of the present disclosure may be implemented as a mobile phone, and the driving method of the display device DD may take place when a user makes a call using the mobile phone.

First, the input sensing unit ISU of the display device DD may enter into a first mode (S10). In the first mode (e.g., a proximity sensing mode), the input sensing unit ISU may be driven using a self-capacitance method. In the first mode, the first electrode driving unit 120 may simultaneously supply a first driving voltage to the first electrodes E1. The second electrode driving unit 130 may also simultaneously supply a second driving voltage to the second electrodes E2. In addition, the first electrode sensing unit 140 may generate a first sensing signal ESS1 and transmit the first sensing signal ESS1 to the control unit 160. The second electrode sensing unit 150 may generate a second sensing signal ESS2 and transmit the second sensing signal ESS2 to the control unit 160.

In the first mode, the control unit 160 of the input sensing unit ISU may determine a proximity of an object (S20). In the first mode, the control unit 160 may receive the first sensing signal ESS1 and the second sensing signal ESS2, and merge the capacitance change values of the first electrodes E1 and capacitance change values of the second electrodes E2. The control unit 160 may then determine the proximity of the object based on the merged value. For example, when the merged value is larger than a predetermined value, the control unit 160 may determine that the object has been proximate.

When it is determined that the object is proximate (YES of S30), the input sensing unit ISU may enter into a second mode (S40). In the second mode (e.g., a shape sensing mode), the input sensing unit ISU may be driven using a mutual-capacitance method. In the second mode, the first electrode driving unit 120 may sequentially supply a first driving voltage to the first electrodes E1. The second electrode driving unit 130 may simultaneously supply a second driving voltage to the second electrodes E2. In addition, the first electrode sensing unit 140 may generate a first sensing signal ESS1 and transmit the first sensing signal ESS1 to the control unit 160. The second electrode sensing unit 150 may generate a second sensing signal ESS2 and transmit the second sensing signal ESS2 to the control unit 160.

In the second mode, the control unit 160 of the input sensing unit ISU may determine a shape of the object (S50). In the second mode, the control unit 160 may receive the first sensing signal ESS1 and the second sensing signal ESS2. The control unit 160 may then determine the shape of the object based on the first sensing signal ESS1 and the second sensing signal ESS2.

When it is determined that the object is the side of a face (S60), the display device DD may enter into a third mode (S70). The third mode may be a call activation mode. In the third mode, the display device DD may stop the display of an image IM in the display region DD-DA, so that power consumption can be reduced. In some embodiments, the display device DD further allocates a system resource to a call function in the third mode, so that call quality can be improved.

The driving method of the display device according to an embodiment shown in FIG. 6B is different from that according to an embodiment shown in FIG. 6A, in that the steps S40, S50, and S60 do not exist.

That is, in the driving method of the display device DD according to an embodiment shown in FIG. 6B, when it is determined that the object has been proximate (YES of S30), the display device DD may immediately enter into the third mode (S70).

Figure 7:
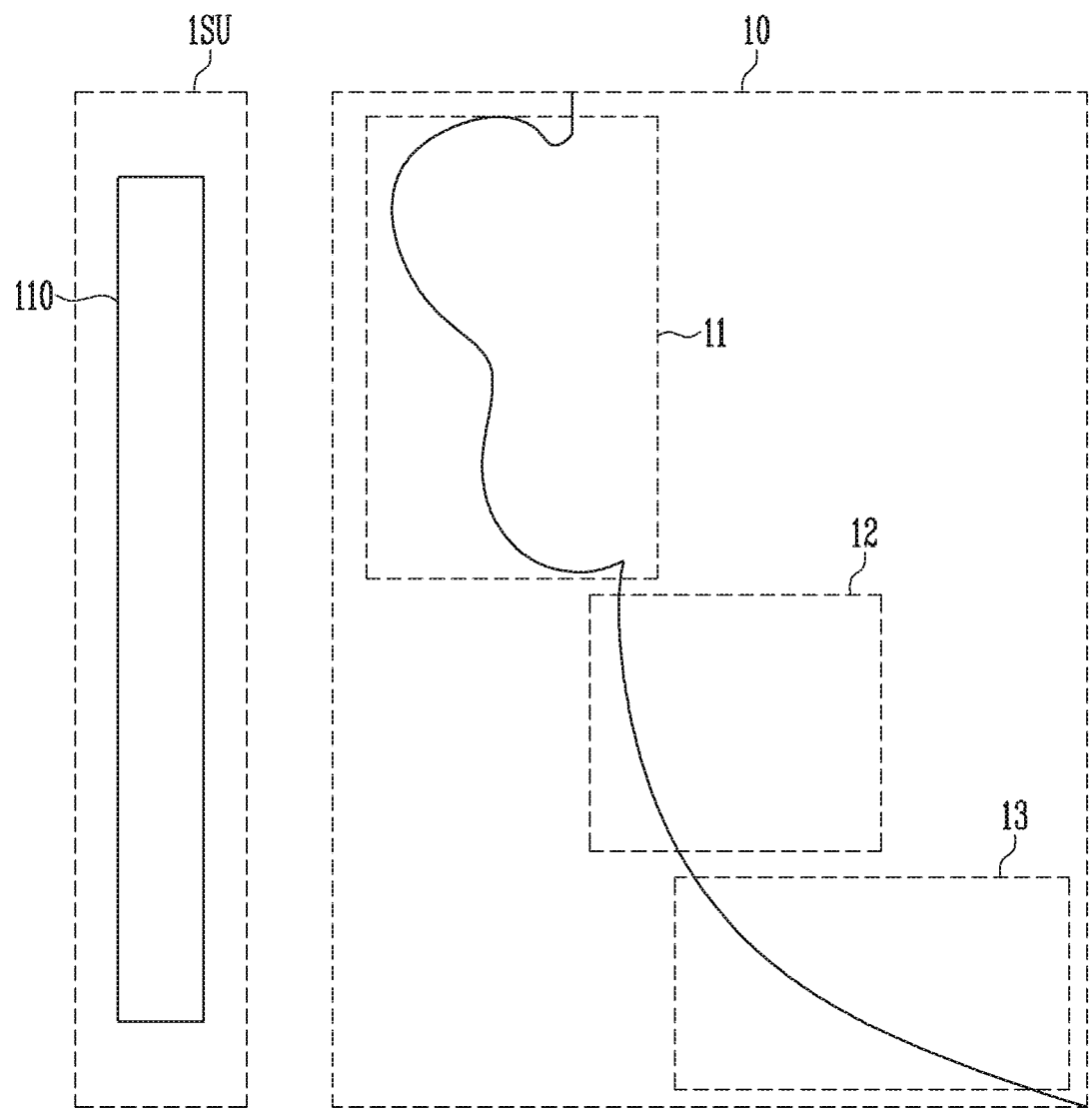
FIG. 7 is a view illustrating a driving method of the display device according to an embodiment of the present disclosure.

FIG. 7 is a view illustrating an operating method of the display device according to an embodiment of the present disclosure.

For convenience of description, the input sensing unit ISU, the electrode unit 110 included therein, and an object (e.g., a side 10 of a face of a user) located near the electrode unit 110 are illustrated in FIG. 7.

Referring to FIGS. 1 to 7, the side 10 of the face of the user may have an ear 11, a cheek 12, and a chin 13.

In a first mode, the first electrode driving unit 120 may simultaneously supply a first driving voltage to the first electrodes E1. The second electrode driving unit 130 may simultaneously supply a second driving voltage to the second electrodes E2. The first electrodes E1 and the second electrodes E2 may be integrated as one electrode to be driven.

When an external object is located near the electrode unit 110 or is in contact with the electrode unit 110, capacitances of the electrodes E1 and E2 of the electrode unit 110 may be changed. The first electrode sensing unit 140 and the second electrode sensing unit 150 may generate a first sensing signal ESS1 and a second sensing signal ESS2 and transmit the first sensing signal ESS1 and the second sensing signal ESS2 to the control unit 160, based on the change in capacitance.

The control unit 160 may receive the first sensing signal ESS1 and the second sensing signal ESS2, and merge all capacitance change values of the first electrodes E1 and capacitance change values of the second electrodes E2. The control unit 160 may determine a proximity of the object (e.g., the side 10 of the face of the user), based on the merged value. For example, when the merged value is larger than a predetermined value, the control unit 160 may determine that the object has been proximate.

In a second mode, the first electrode driving unit 120 may sequentially supply a first driving voltage to the first electrodes E1. The second electrode driving unit 130 may simultaneously supply a second driving voltage to the second electrodes E2. Unlike the first mode, the input sensing unit ISU may have resolution capable of determining a shape of the object. Therefore, the input sensing unit ISU may determine the shape of the object that has been approximate.

For example, since the side 10 of the face has the ear 11, the cheek 12, and the chin 13, capacitances of electrodes E1 and E2 located corresponding to the ear 11, the cheek 12, and the chin 13 may be differently changed.

The first electrode sensing unit 140 and the second electrode sensing unit 150 may transmit the first sensing signal ESS1 and the second sensing signal ESS2 to the control unit 160, based on the change in capacitance.

The control unit 160 may receive the first sensing signal ESS1 and the second sensing signal ESS2. The control unit 160 may determine the shape of the object, based on the first sensing signal ESS1 and the second sensing signal ESS2. The control unit 160 may determine whether the object is the side 10 of the face of the user by comparing the determined shape of the object with pre-stored face data. The pre-stored face data may include a shape pattern of the side 10 of the face.

When it is determined that the object is the side 10 of the face, the display device DD may be driven in a third mode. The third mode may mean a call activation mode. In the third mode, the display device DD stops the display of the image IM in the display region DD-DA, so that power consumption can be reduced. In some embodiments, the display device DD further allocates a system resource to a call function in the third mode, so that call quality can be improved.

That is, electrodes E1 and E2 may provide capacitances that represent different distances from the input sensing unit ISU. The different distances associated with electrodes E1 and E2 (located at different locations in a two dimensional plane of the input sensing unit ISU) may form a surface in a 3 dimensional space (i.e., the shape of the proximate object). In some cases, the shape may be represented as a vector.

It may then be determined whether the shape satisfies the conditions for changing the mode of operation. For example, a shape vector may be used as input for a model such as machine learning model that takes the vector as an input and outputs either a binary determination of whether the shape matches a condition (i.e., whether the shape corresponds the side of a face) or a non-binary determination indicating one of several possible shapes. In some cases, the device may determine a likelihood that the detected shape falls within one or more possible shape categories.

Thus, power consumption can be reduced in the display device. Furthermore, in some cases call quality can be improved.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present disclosure as set forth in the following claims.

What is claimed is:

1. A display device comprising:
   a base layer;
   a circuit element layer disposed on the base layer, the circuit element layer including at least one insulating layer and at least one circuit element;
   a display element layer disposed on the circuit element layer, the display element layer including a light emitting element;
   a thin film encapsulation layer disposed on the display element layer, the thin film encapsulation layer including at least one inorganic layer and at least one inorganic layer; and
   an input sensing unit disposed on the thin film encapsulation layer, the input sensing unit sensing a user input,
   wherein the input sensing unit includes:
   an electrode unit including first electrodes and second electrodes, which intersect each other;
   a first electrode sensing unit configured to generate a first sensing signal representing capacitance change values of the first electrodes;
   a second electrode sensing unit configured to generate a second sensing signal representing capacitance change values of the second electrodes; and
   a control unit configured to determine a proximity of an object or a shape of the object based on the first sensing signal and the second sensing signal.

2. The display device of claim 1, wherein the control unit is configured to merge the capacitance change values to produce a merged value and to determine the proximity of the object based on the merged value, in a first mode based on a self-capacitance method.

3. The display device of claim 2, wherein the display panel is configured to enter a second mode based on a mutual-capacitance method when it is determined that the object has been proximate; and wherein the control unit is configured to determine the shape of the object based on the capacitance change values in the second mode.

4. The display device of claim 2, wherein, the first electrodes and the second electrodes are driven simultaneously as one electrode in the first mode.

5. The display device of claim 3, wherein the display panel is configured to enter a third mode when it is determined that the object is a side of a face, and wherein the display panel is configured to stop displaying the image in the third mode.

6. The display device of claim 2, wherein the input sensing unit further includes:
   a first electrode driving unit configured to provide a first driving voltage to the first electrodes; and
   a second electrode driving unit configured to provide a second driving voltage to the second electrodes,
   wherein, in the first mode, the first electrode driving unit and the second electrode driving unit simultaneously supply the first driving voltage and the second driving voltage to the first electrodes and the second electrodes.

7. The display device of claim 6, wherein the first driving voltage and the second driving voltage are equal to each other.

8. The display device of claim 2, wherein each of the first electrodes includes first sensor parts and first connecting parts for connecting the first sensor parts to each other, and
   each of the second electrodes includes second sensor parts and second connecting parts for connecting the second sensor parts to each other,
   wherein the first sensor parts and the second sensor parts are disposed in a same layer.

9. The display device of claim 8, wherein the first connecting parts and the second connecting parts are disposed in different layers.

10. The display device of claim 2, wherein the display panel is configured to enter a third mode when it is determined that the object has been proximate, and wherein the display panel is configured to stop displaying the image in the third mode.

11. An electronic device comprising:
    a display device; and
    a main board on which electronic modules, a camera module, and a power module are mounted;
    wherein the display device comprising:
    a display panel configured to display an image; and
    an input sensing unit disposed on the display panel, the input sensing unit sensing a user input,
    wherein the input sensing unit includes:
    an electrode unit including first electrodes and second electrodes, which intersect each other;
    a first electrode sensing unit configured to generate a first sensing signal representing capacitance change values of the first electrodes;
    a second electrode sensing unit configured to generate a second sensing signal representing capacitance change values of the second electrodes; and
    a control unit configured to determine a proximity of an object or a shape of the object based on the first sensing signal and the second sensing signal.

12. The electronic device of claim 11, wherein the control unit is configured to merge the capacitance change values to produce a merged value and to determine the proximity of the object based on the merged value, in a first mode based on a self-capacitance method.

13. The electronic device of claim 12, wherein the display panel is configured to enter a second mode based on a mutual-capacitance method when it is determined that the object has been proximate; and wherein the control unit is configured to determine the shape of the object based on the capacitance change values in the second mode.

14. The electronic device of claim 12, wherein, the first electrodes and the second electrodes are driven simultaneously as one electrode in the first mode.

15. The electronic device of claim 13, wherein the display panel is configured to enter a third mode when it is determined that the object is a side of a face, and wherein the display panel is configured to stop displaying the image in the third mode.

16. The electronic device of claim 12, wherein the display panel is configured to enter a third mode when it is determined that the object has been proximate, and wherein the display panel is configured to stop displaying the image in the third mode.

* * * * *